Sept. 29, 1959     R. L. STEINBERGER     2,906,993
TRANSDUCER FOR UNDERWATER SOUND
Filed May 22, 1946
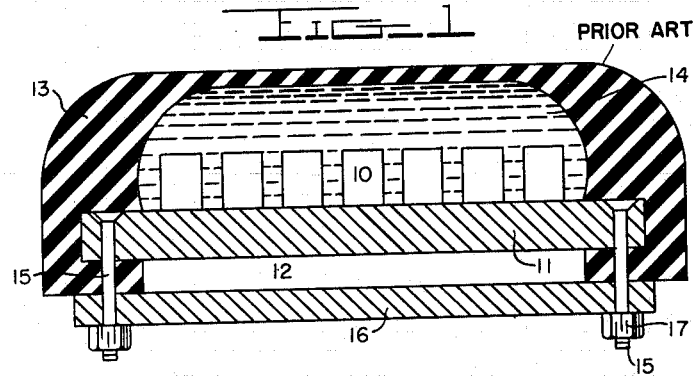
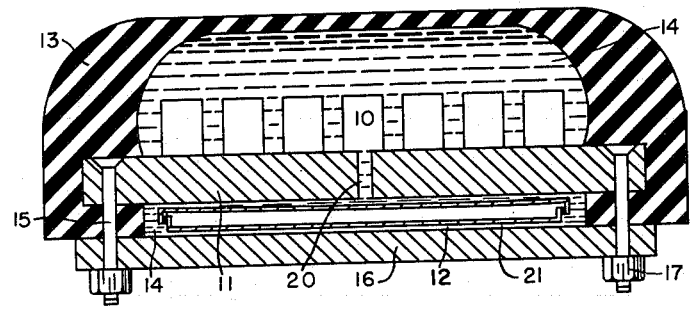
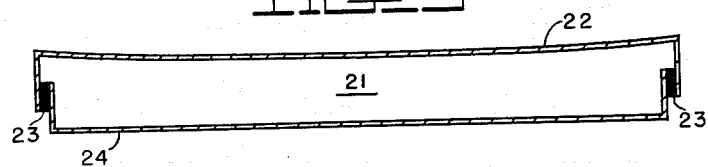
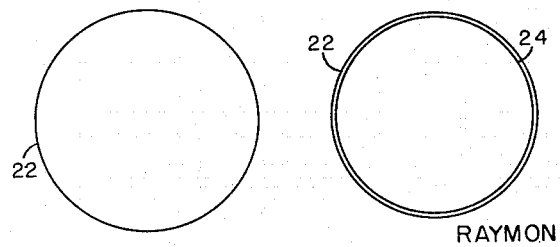
Inventor
RAYMOND L. STEINBERGER
By M. O. Hayes
Attorney 2,906,993
Patented Sept. 29, 1959

2,906,993

TRANSDUCER FOR UNDERWATER SOUND

Raymond L. Steinberger, Alexandria, Va.

Application May 22, 1946, Serial No. 671,491

3 Claims. (Cl. 340—10)

(Granted under Title 35, U.S. Code (1952), sec. 266)

This invention relates to improvements in submarine compressional wave receivers and radiators. More particularly it relates to improvements in the constructions of submarine compressional wave receivers and radiators involving crystals, the improved features cooperating to effectively increase the efficiency and uniformity of the transmitting and receiving characteristics of such devices.

Objects of the invention are to provide a directive receiver and radiator for use in submarine compressional wave systems which will have a minimum of back radiation, lighter weight, less structural distortion, and more uniformity of transmitting and receiving characteristics over a wide range of depths than devices of this class previously employed in the art.

Features of the invention are the use of the pressure-transmissive qualities of an oil or like liquid to equalize the forces acting on the front and the back of the receiving and radiating face, the use of a sealed air-filled cell freely floating in the oil in the region behind the receiving and radiating face to minimize back radiation, and the substantial elimination of stresses introduced in the vibrating system and of structural difficulties and uncontrollable vibrating characteristics at great depths.

In the following description and claims it will be convenient to refer to a compressional wave receiver and radiator as a transducer.

As an essential element, many known constructions of piezoelectric transducers have an array of crystals attached to a plane face of a single cylindrical metal backing plate. In addition, there is a liquid in contact with these crystals which affords an effective acoustic impedance match of the sea water to the crystal vibrating system. The other face of the backing plate is generally in contact with an air-filled cavity, which affords a high degree of reflectivity to the compressional disturbances, thus minimizing back radiation. It is with this type of construction that the present invention is concerned.

In the initial construction of these transducers, the metal backing plate is carefully prepared to present a planar surface to which the crystals may be cemented or otherwise suitably attached. Under hydrostatic pressure, however, the center of the backing plate will bend inward towards the air space. Because of this, the backing plate, the cement or other means joining crystals to the backing plate, and the crystals themselves are subjected to internal stresses. As the operating depths are increased, these stresses are aggravated, and often result in structural failure. At the same time, the stresses will alter the vibrating characteristics of the backing plate. It may be expected that such stresses increasing with the depth will alter the overall characteristics of the vibrating system of crystals and plate.

In addition the transducers have constructions which vary according to the specific use to which they are put. It is often desirable to have a radiating and receiving beam pattern which is directive; it is always desirable to reduce side lobes for any directive pattern. The constructions undertaken with the aim of securing these desirable features bring up difficulties in connection with depth of operation, as follows:

In order to achieve high directivity of beam pattern, the transducer radiating and receiving face is made wide in the dimensions transverse to the beam axis. The longer the wave length at which operation is desired, the wider these dimensions. In the known constructions composed of elements as described above, increase in width will cause a greater difference between the forces on the two sides of the metal backing plates when it is subjected to hydrostatic pressure.

In order to reduce side lobes, different parts of the array are sometimes driven to vibrate at different amplitudes. It is more difficult to do this with a backing plate on which are imposed stresses due to hydrostatic pressure. As a particular effect of such hydrostatic pressure, the vibrating amplitude at different parts of the array become less controllable than would be desired.

As will appear hereinunder, it has been found entirely practicable to construct a piezoelectric transducer which has operating characteristics largely independent of hydrostatic pressure. Moreover, the transducer has a minimum of back radiation. This has been accomplished despite lessening of the overall weight of the transducer and without difficulties of structural distortion and failure.

The principles of the invention will be more readily understood from the following detailed description in conjunction with the appended figures, of which:

Figure 1 depicts the elements of a known type of transducer in central section,

Figure 2 shows in central section the elements of a design of transducer embodying the principles of the present invention, and Figure 3 shows a face bottom and top view and a section of an air cell designed to eliminate back radiation in the embodiment of Figure 2.

With reference to Figure 1, the known transducer there shown in section comprises an electroacoustic vibrating element consisting of an array of crystals 10, cemented to a metal backing plate 11. Suitable electrical connections, not shown in the figure, are assumed made to the crystals. Immediately behind the backing plate 11 is a cavity 12, which is filled with air. The front of the vibrating element is sealed from the sea water by means of a front rubber wall portion 13. The wall portion being flexible, allows transmission of hydrostatic pressure and of compressional wave disturbances. The interior of the housing is filled with an oil or other suitable liquid 14 which furnishes acoustic coupling and an impedance match between the sea water and the crystals. The lower rim of the rubber wall portion 13 serves as a gasket to seal the air in cavity 12. Some other acoustically isolating gasket might equally well be provided. The metal backing plate 11 is secured to a frame or mounting plate 16 which forms a rear wall portion for the complete housing, by means of bolts 15 and nuts 17 spaced at regular angular intervals around the circumference of the backing plate.

In the constructions of such known transducers, the crystals 10 are cemented to the metal backing plate 11 when the plate presents a plane face. Under hydrostatic pressure, the plate 11 tends to bend inward owing to the difference in forces on its front and back, thus distorting the vibrating system and causing the crystals to crack, or break away from the backing plate.

In Figure 2 are depicted the elements of a transducer embodying the principles of the present invention. In part, the elements are the same as have been described in connection with Figure 1: there are crystals 10 cemented to metal backing plate 11, a housing having a front wall portion of rubber, oil or other suitable liquid 14 filling the interior between the metal plate 11 and the housing wall portion 13, bolts 15 and nuts 17 securing the metal plate 11 to a plate member 16 which forms a rear wall portion for the complete housing. The transducer of Figure 2 differs from that of Figure 1 in that the cavity 12 that was formerly a sealed air space is now free flooded with the oil 14. A hole 20 is drilled through the center of the metal plate 11 to render continuous the body of oil 14 and allow free flow of the oil into the cavity 12. The mismatch of acoustic impedance necessary to prevent back radiation is provided by means of a separate disc-shaped air cell 21 floating freely in the oil 14 in the cavity. The dimensions of the air cell 21 are made a little smaller than the dimensions of the cavity so that limited but free movement of the cell may take place in the oil-filled cavity.

A section and top and bottom view, to different scales, of the air cell 21 are shown in Figure 3. It consists in this embodiment of a pair of light shallow overlapping cylindrical cans 22 and 24, of slightly different diameter, which are sealed with a solder 23. In this figure the space occupied by the solder 23 is exaggerated. The air in the cells may be under a pressure of five or ten pounds to the square inch. The cans 22 and 24 are of light metal, so that the flat sides will bend towards each other when the cell is under hydrostatic pressure. The maximal hydrostatic pressure that the transducer embodying the principles of the invention will withstand and yet substantially prevent back radiation is determined by the pressure at which the flat sides 22 and 24 make firm contact over an appreciable area.

It has been found that an air cell comprising a sealed air filled disc-like rubber bag serves the purpose of preventing back radiation equally well. In fact, a cell with pliable sides has an advantage of more equal distribution of stress over its surface.

The location of the hole 20 drilled through the plate 1 is not at all critical in regards affecting the vibrating characteristics of the transducer. In fact it has been found that drilling the hole in any available location on the plate has entirely negligible effect.

It is noteworthy that in the construction of Figure 2 the crystals are always situated on a plane face of the metal backing plate. There are no strains arising from hydrostatic pressure. It is easily seen therefore that no structural difficulties are involved in operation at great depths in the transducer of the invention.

Although many known constructions of transducers differ in detail from that illustrated in Figure 1, many transducers have the same essential construction composed of elements such as are shown in the figure. These elements are: a vibrating system of crystals attached to a plane metal backing plate, a housing for the vibrating system containing a liquid which matches the acoustic impedances of the sea water and the vibrating system, and an air space on the other side of the vibrating system to provide a high degree of mismatch of acoustic impedance to the vibrating system.

It should be understood that other means for equalizing pressure on the front and rear of the vibrating system are contemplated in the invention. For example, there may be no direct connection between the interior of the housing and the cavity. The cavity may be filled with oil independently, and a pipe also filled with oil leading from it to the sea water and containing a flexible diaphragm. This will serve to equalize the pressure.

Many other variations and applications of the principles of the invention will be apparent to those skilled in the art. No attempt has been made here to exhaustively cover or point out all applications of these principles.

The invention described herein may be manufactured and used by or for the Government of the United States of America for governmental purposes without the payment of any royalties thereon or therefor.

I claim:

1. An underwater sound transducer comprising, a fluid-tight housing having a resilient front wall and a rigid rear wall interconnected by at least one sidewall, an electro-acoustic vibration detection element including a metal backing plate with broad front and rear faces and an array of piezoelectric crystals mounted on said broad front face, said detection element being mounted in said housing between said front and rear walls with said crystal array facing and spaced from said front wall, a sealed wafer-shaped cell having a resilient wall and containing a compressible gas, said cell being interposed between said detection element and said rigid rear wall with said resilient wall spaced from said detection element and the walls of said housing, whereby said housing includes a plurality of interior chambers defined by the walls of said housing, the resilient wall of said cell, said crystals and the faces of said detection element, a fluid medium filling said chambers, and fluid conducting means interconnecting all of said chambers which are bounded by a resilient wall, said cell being proportioned and arranged to place said compressible gas in substantially all of the paths for sound energy defined by said fluid medium which connect the front and rear faces of said detector element.

2. The transducer according to claim 1 wherein said fluid conducting path comprises an aperture in said backing plate.

3. The transducer according to claim 1 wherein said cell is free floating in said fluid medium.

References Cited in the file of this patent

UNITED STATES PATENTS

| | | |
|---|---|---|
| 1,067,207 | Williams | July 8, 1913 |
| 1,563,626 | Hecht et al. | Dec. 1, 1925 |
| 2,283,285 | Pohlman | May 19, 1942 |
| 2,374,637 | Hayes | Apr. 24, 1945 |
| 2,384,465 | Harrison | Sept. 11, 1945 |
| 2,405,226 | Mason | Aug. 6, 1946 |
| 2,406,767 | Hayes | Sept. 3, 1946 |
| 2,436,377 | Briggs et al. | Feb. 24, 1948 |